(12) United States Patent
Zhang

(10) Patent No.: US 9,470,359 B2
(45) Date of Patent: Oct. 18, 2016

(54) BASE COMPONENT

(71) Applicant: Anho Houseware Co., Ltd. Jiangmen, Jiangmen, Guangdong (CN)

(72) Inventor: Decai Zhang, Guangdong (CN)

(73) Assignee: Anho Houseware Co., Ltd. Jiangmen, Jiangmen, Guangdong (CN)

( * ) Notice: Subject to any disclaimer, the term of this patent is extended or adjusted under 35 U.S.C. 154(b) by 0 days.

(21) Appl. No.: 14/412,688

(22) PCT Filed: Jul. 10, 2013

(86) PCT No.: PCT/CN2013/079152
§ 371 (c)(1),
(2) Date: Jan. 4, 2015

(87) PCT Pub. No.: WO2014/008862
PCT Pub. Date: Jan. 16, 2014

(65) Prior Publication Data
US 2015/0330560 A1 Nov. 19, 2015

(30) Foreign Application Priority Data

Jul. 10, 2012 (CN) ............ 2012 2 0332977 U

(51) Int. Cl.
*A47G 29/00* (2006.01)
*F16M 13/02* (2006.01)
(Continued)

(52) U.S. Cl.
CPC .......... *F16M 13/02* (2013.01); *A47G 25/0635* (2013.01); *B25H 3/00* (2013.01); *F16B 9/026* (2013.01); *A47K 2201/00* (2013.01)

(58) Field of Classification Search
CPC ...... F16M 13/02; F16B 9/026; A47K 10/10; A47K 2201/00; A47K 2201/02; A47B 96/061; B25H 3/00; A47G 25/0635
USPC ............ 248/223.41, 224.51, 224.61, 220.22, 248/221.11; 211/16
See application file for complete search history.

(56) References Cited

U.S. PATENT DOCUMENTS 1,252,207 A * 1/1918 Walker ............ 248/221.11
1,356,745 A * 10/1920 Schwartz ............ F21V 21/02
248/224.51

(Continued)

FOREIGN PATENT DOCUMENTS

CN 2681637 Y 3/2005
CN 201528970 U 7/2010

(Continued)

OTHER PUBLICATIONS

International Search Report and Written Opinion (Chinese language), issued by the State Intellectual Property Office of the P.R. China, dated Oct. 17, 2013 for International Application No. PCT/CN2013/079152; 10 pages.

(Continued)

*Primary Examiner* — Anita M King
(74) *Attorney, Agent, or Firm* — Faegre Baker Daniels LLP

(57) ABSTRACT

A base component for loading, hanging or supporting objects has a connecting rod connected with a fixed base and a cover which sleeves the connecting rod and covers the fixed base. The fixed base is connected with the connecting rod by a linear guide pair. The linear guide pair is closed for avoiding digression after the fixed base is covered by the cover. The base component is simple in structure and convenient to install and use, because it allows changing loaded objects rapidly without disassembling the fixed base.

5 Claims, 5 Drawing Sheets

(51) Int. Cl.
 *F16B 9/02* (2006.01)
 *B25H 3/00* (2006.01)
 *A47G 25/06* (2006.01)

(56) References Cited

U.S. PATENT DOCUMENTS

| | | | | |
|---|---|---|---|---|
| 2,144,602 | A * | 1/1939 | Balmer | A47B 96/061 248/222.13 |
| 2,732,159 | A * | 1/1956 | Connors et al. | A47K 10/10 222/180 |
| 3,131,251 | A * | 4/1964 | Ryan | B60R 1/04 248/224.51 |
| 3,521,758 | A * | 7/1970 | Guilfoyle, Sr. | A47G 25/0692 211/105.4 |
| 6,250,597 | B1 * | 6/2001 | Kuo | A47K 10/10 211/16 |
| 6,481,679 | B1 * | 11/2002 | Bennett | A61G 13/101 248/223.41 |
| 2011/0132854 | A1 | 6/2011 | Berdahl et al. | |

FOREIGN PATENT DOCUMENTS

| | | |
|---|---|---|
| CN | 201557943 U | 8/2010 |
| CN | 201557944 U | 8/2010 |
| CN | 201727294 U | 2/2011 |
| CN | 202751301 U | 2/2013 |
| DE | 2821368 | 11/1979 |

OTHER PUBLICATIONS

International Search Report (English language), issued by the State Intellectual Property Office of the P.R. China, dated Oct. 17, 2013 for International Application No. PCT/CN2013/079152; 3 pages.
European Search Report issued by the European Patent Office for European Patent Application No. 13816822 (International Patent App. No. PCT/CN2013/079152), dated Apr. 8, 2016; 7 pages.

* cited by examiner

BASE COMPONENT

The present application is the national phase of International Application No. PCT/CN2013/079152, titled "BASE COMPONENT", filed on Jul. 10, 2013, which claims the benefit of priority to Chinese patent application No. 201220332977.X titled "BASE COMPONENT", filed with the Chinese State Intellectual Property Office on Jul. 10, 2012, the entire disclosures of both applications are incorporated herein by reference.

TECHNICAL FIELD

The present application relates to a base component for bearing, hanging and supporting.

BACKGROUND

In the conventional technology, a base component for bearing, hanging and supporting generally includes a fixing base, a connecting rod connected to the fixing base, and a housing sleeved on the connecting rod and covering the fixing base. The connecting rod is usually connected to a bearing member, such as a hanger, a shelf and a supporting rod. The base component may also be used in conjunction with various products for kitchen and bathroom which are required to be connected to a wall surface with tubular members thereof, such as a single hook, a double hook, a towel bar and a glass shelf. The fixing base is normally connected to the connecting rod by welding, and the housing for covering the fixing base can hide the welding position and has a decorative effect. However, in the practice application, once the fixing base of the base component is fixed, the bearing member connected to the fixing base, especially the towel bar, the glass shelf and other products which are fixed on the wall, will be wholly fixed and cannot be changed as desired, and can only be replaced by being disassembled from the wall together with the fixing base, thus the base component is inconvenient to use and single purposed.

SUMMARY

A technical issue to be addressed by the present application is to provide a base component which allows replacing a bearing member rapidly without disassembling the fixing base, and have a simple structure, is convenient to install and use, and is versatile.

In order to address the above technical issue, a base component is provided according to the technical solution of the present application, which includes a fixing base, a connecting rod connected to the fixing base, and a housing sleeved on the fixing base and covering the fixing base, wherein the fixing base is connected to the connecting rod by a linear guide pair, and the linear guide pair is wholly closed by the housing when the fixing base is covered by the housing, which prevents a derailment of the linear guide pair.

According to one of preferred embodiments of the present application, a T-shaped guide groove is provided at a middle of an upper surface of the fixing base and runs through the entire upper surface of the fixing base radially, the connecting rod includes a bearing connecting rod and a guide piece fixedly connected to an end of the bearing connecting rod, and the guide piece and the T-shaped guide groove cooperate with each other to form the linear guide pair.

According to a further solution of the preferred technical solution of the present application, the bearing connecting rod is fixedly connected to the guide piece by a screw.

According to a further solution of the preferred technical solution of the present application, an avoiding groove is provided at a middle of a bottom of the T-shaped guide groove and is in parallel with the T-shaped guide groove.

According to a second preferred technical solution of the present application, base fixing holes are symmetrically provided at two sides of the linear guide pair of the fixing base.

According to a further solution of all preferred technical solutions of the present application, each of the fixing base and the housing is circular, elliptical or square.

The present application has the following beneficial effects, the fixing base is connected with the connecting rod by the linear guide pair, and the linear guide pair is wholly closed by the housing when the fixing base is covered by the housing, thereby preventing the derailment of the linear guide pair. Therefore, due to such structure, the connecting rod can be assembled with and disassembled from the fixing base rapidly, and the connecting rod can be used as a standard component to be connected with different bearing members, and the bearing members can be rapidly replaced or changed without disassembling the fixing base, thus the base component of the present application has a simple structure, is convenient to install and use, and is versatile.

BRIEF DESCRIPTION OF THE DRAWINGS

The base component of the present application will be described in detail hereinafter in conjunction with the accompanying drawings.

DETAILED DESCRIPTION

As shown in FIGS. 1 to 7, a base component according to an embodiment of the present application includes a fixing base 1, a connecting rod 2 connected to the fixing base 1, and a housing 3 sleeved on the connecting rod 2 and covering the fixing base 1. The fixing base 1 is connected with the connecting rod 2 by a linear guide pair, and the linear guide pair is wholly closed by the housing 3 after the housing 3 covers the fixing base 1, thereby preventing a derailment of the linear guide pair. In this embodiment, the linear guide pair may be a dovetail groove guide pair, a T-shaped groove guide pair, a sleeve-type guide pair, and etc., thus the connecting rod 2 can be rapidly assembled and disassembled to replace or change a bearing member connected to the connecting rod 2, such as a hook, a towel bar, a glass shelf, a hanger and a supporting rod, thereby realizing the versatile effect.

Figure 1:
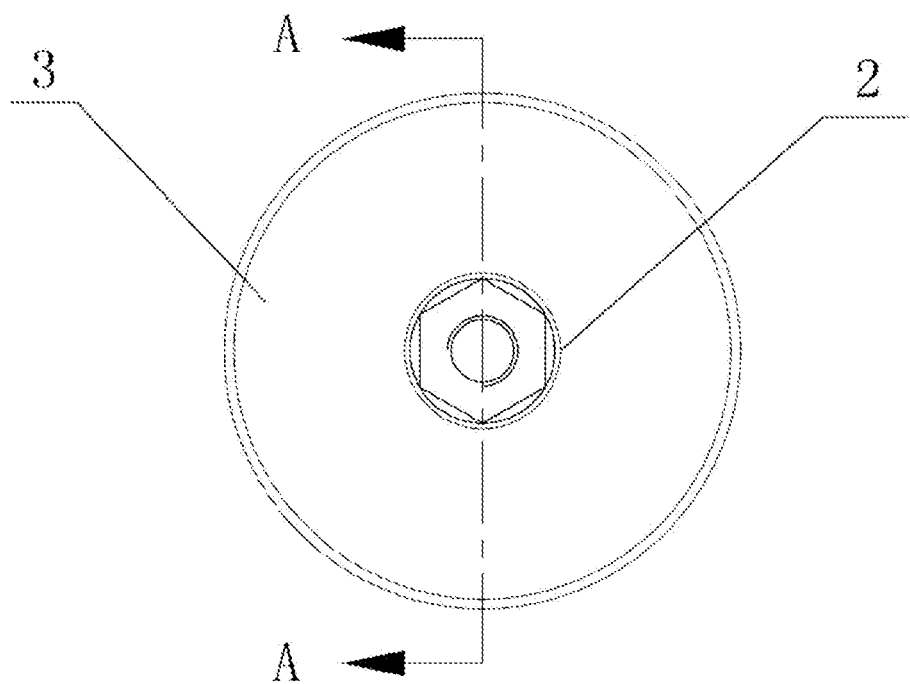
FIG. 1 is a front view of a base component of the present application.
Figure 2:
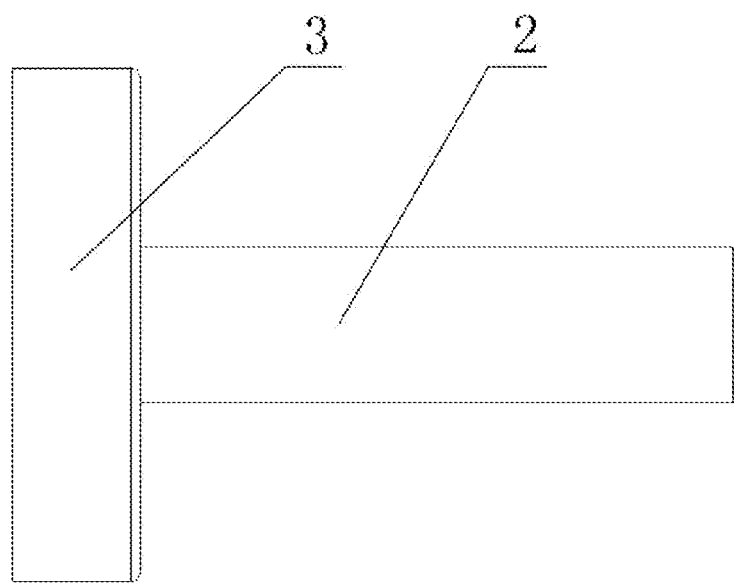
FIG. 2 is a left view of FIG. 1.
Figure 3:
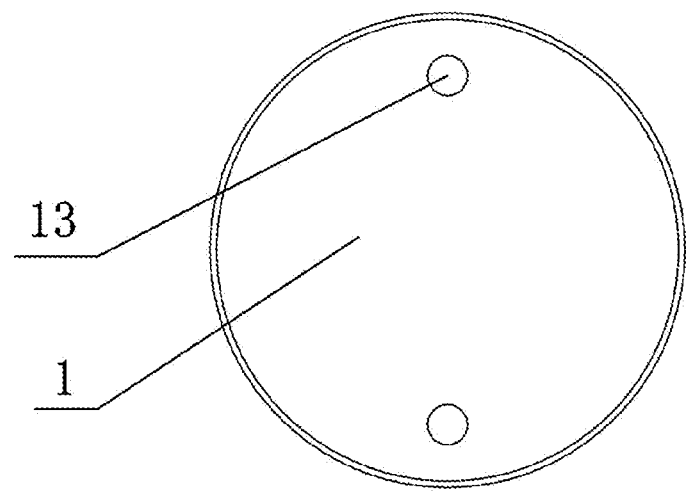
FIG. 3 is a rear view of FIG. 1.
Figure 4:
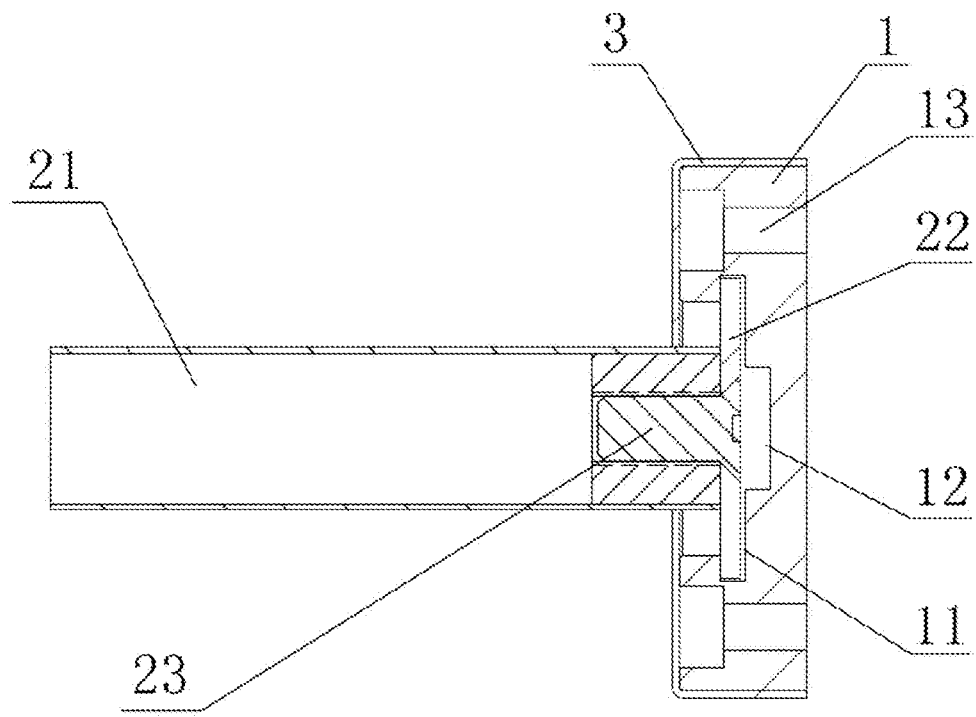
FIG. 4 is a sectional view taken in line A-A of FIG. 1.
Figure 5:
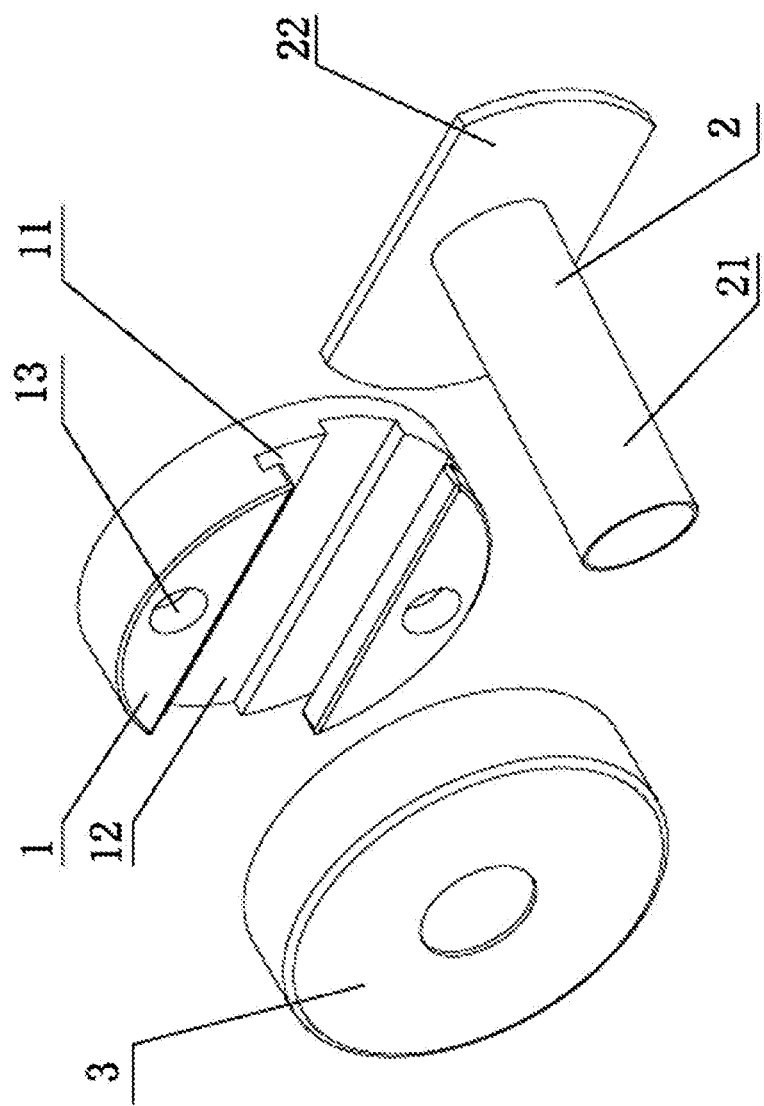
FIG. 5 is an assembly schematic view of the base component of the present application.
Figure 6:
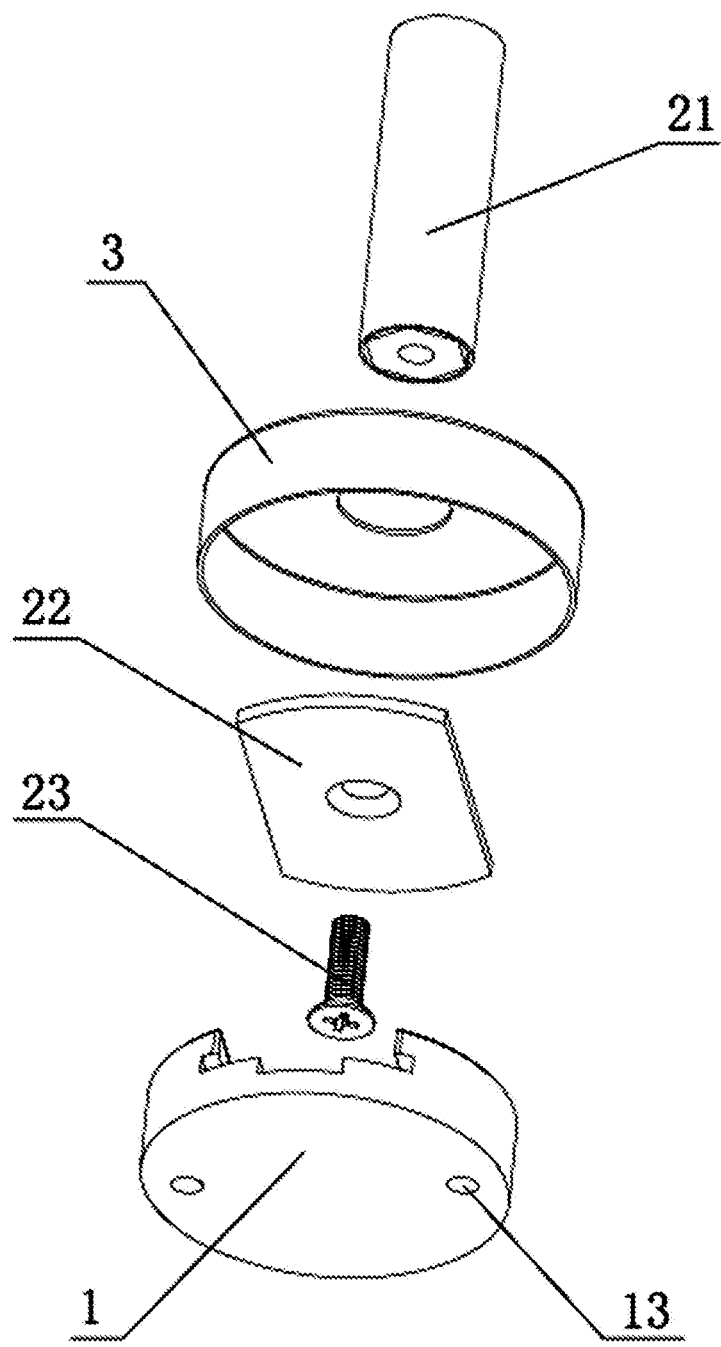
FIG. 6 is an exploded view showing the structure of the base component of the present application.
Figure 7:
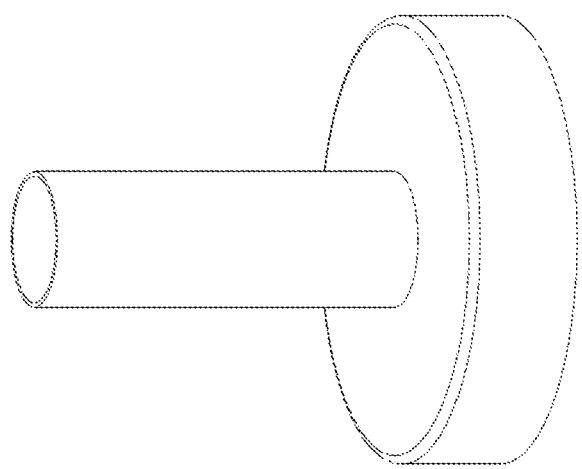
FIG. 7 is a perspective view of the base component of the present application.

As shown in FIGS. 4 to 6, according to one of preferred embodiments of the present application, a T-shaped guide groove 11 is provided at a middle of an upper surface of the fixing base 1 and runs through the entire upper surface of the fixing base 1 radially, the connecting rod 2 includes a bearing connecting rod 21 and a guide piece 22 fixedly connected to an end of the bearing connecting rod 21, and the guide piece 22 and the T-shaped guide groove 11 cooperate with each other to form a linear guide pair. In this embodiment, the fixedly connection between the guide piece 22 and the end of the bearing connecting rod 21 may be realized by welding, threaded connection, screw connection and etc.

As shown in FIGS. 4 to 6, according to a further preferable solution of the above preferred embodiment, the bearing connecting rod 21 is fixedly coupled to the guide piece 22 by a screw 23.

As shown in FIGS. 4 to 6, according to a further preferable solution of the above preferred embodiment, an avoiding groove 12 is provided at the middle of a bottom of the T-shaped guide groove 11 and is in parallel to the T-shaped guide groove 11. In this embodiment, the avoiding groove 12 can reduce the resistance to the guide piece 22 as the guide piece 22 enters into the T-shaped guide groove 11 and at the same time avoid the screw head of the screw connection, thus the connecting rod 2 is more convenient to assemble and disassemble.

As shown in FIGS. 1 to 6, according to a second preferred embodiment of the present application, base fixing holes 13 are symmetrically provided at two sides of the linear guide pair of the fixing base 1. In this embodiment, screws may be screwed into the base fixing holes 13 to fix the fixing base 1.

According to a further preferable solution of all preferred embodiments of the present application, each of the fixing base 1 and the housing 3 may be circular, elliptical or square. The fixing base 1 and the housing 3 may also have other shapes.

In the present application, the fixing base 1 is connected with the connecting rod 2 by the linear guide pair, and the linear guide pair is wholly closed by the housing 3 after the housing 3 covers the fixing base 1, thereby preventing the derailment of the linear guide pair. Therefore, due to such structure, the connecting rod can be assembled with and disassembled from the fixing base rapidly, and the connecting rod can be used as a standard component to be connected with different bearing members, such as a hook, a towel bar, a glass shelf, a hanger, a supporting rod and etc., and the bearing members can be rapidly replaced or changed without disassembling the fixing base, thus the base component of the present application has a simple structure, is convenient to install and use, and is versatile.

The above-described embodiments are only preferred embodiments of the present application, and are not intended to limit the scope of the present application. Any similar means used for achieving the object of the present application should fall into the scope of the present application.

The invention claimed is:

1. A base component, comprising a fixing base, a connecting rod connected to the fixing base, and a housing sleeved on the fixing base and covering the fixing base, wherein the fixing base is connected to the connecting rod by a linear guide pair, and the linear guide pair is wholly closed by the housing when the fixing base is covered by the housing, which prevents a derailment of the linear guide pair;

a T-shaped guide groove is provided at a middle of an upper surface of the fixing base and runs through the entire upper surface of the fixing base radially, the connecting rod comprises a bearing connecting rod and a guide piece fixedly connected to an end of the bearing connecting rod, and the guide piece and the T-shaped guide groove cooperate with each other to form the linear guide pair; and an avoiding groove is provided at a middle of a bottom of the T-shaped guide groove and is parallel with the T-shaped guide groove.

2. The base component according to claim 1, wherein the bearing connecting rod is fixedly connected to the guide piece by a screw.

3. The base component according to claim 2, wherein each of the fixing base and the housing is circular, elliptical or square.

4. The base component according to claim 1, wherein base fixing holes are symmetrically provided at two sides of the linear guide pair of the fixing base.

5. The base component according to claim 1, wherein each of the fixing base and the housing is circular, elliptical or square.

* * * * *